United States Patent
Czajkowski et al.

(10) Patent No.: US 7,945,920 B2
(45) Date of Patent: May 17, 2011

(54) ENFORCING PROPER RESOLUTION FOR CLASSES OF SHARED OBJECTS IN A VIRTUAL MACHINE

(75) Inventors: Grzegorz Czajkowski, Mountain View, CA (US); Laurent Daynes, Saint-Ismier (FR); Michal Wegiel, Cracow (PL)

(73) Assignee: Oracle America, Inc., Redwoood City, CA (US)

( * ) Notice: Subject to any disclaimer, the term of this patent is extended or adjusted under 35 U.S.C. 154(b) by 1015 days.

(21) Appl. No.: 11/524,222

(22) Filed: Sep. 19, 2006

(65) Prior Publication Data

US 2008/0126781 A1    May 29, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................... 719/332; 719/320
(58) Field of Classification Search .................. 719/332, 719/320; 707/103 R
See application file for complete search history.

(56) References Cited

U.S. PATENT DOCUMENTS

| | | | |
|---|---|---|---|
| 6,519,594 B1 * | 2/2003 | Li | 707/10 |
| 6,738,977 B1 * | 5/2004 | Berry et al. | 719/332 |
| 6,807,664 B1 * | 10/2004 | Ohi | 717/164 |
| 6,917,967 B2 * | 7/2005 | Wu et al. | 709/213 |
| 7,246,135 B2 * | 7/2007 | Reid | 707/103 Z |
| 2005/0086237 A1 * | 4/2005 | Monnie et al. | 707/100 |
| 2006/0070051 A1 * | 3/2006 | Kuck et al. | 717/162 |
| 2008/0072238 A1 * | 3/2008 | Monnie et al. | 719/310 |

* cited by examiner

*Primary Examiner* — Diem K Cao
(74) *Attorney, Agent, or Firm* — Osha • Liang LLP

(57) ABSTRACT

Disclosed techniques ensure that isolates that are attached to a shared object region will see appropriate class states. In response to an isolate's attempt to instantiate, in such a region, an object that is an instance of a particular class, a bootstrap class' identity is added to that region's bootstrap class list. In response to an isolate's attempt to attach to the region, each class that is both (a) in the region's associated bootstrap class list, and (b) not yet initialized for that isolate, is initialized for that isolate. Thus, those bootstrap classes are seen by that isolate as being in the "initialized" state. In response to an isolate's addition of a particular bootstrap class to the region's list of dependent bootstrap classes, the particular bootstrap class is initialized for each of the isolates attached to the region and for which the bootstrap class is not initialized yet.

14 Claims, 7 Drawing Sheets

---

202
ISOLATE ATTEMPTS TO ATTACH TO SHARED OBJECT REGION

↓

204
SELECT, FROM REGION'S BOOTSTRAP CLASS LIST, ALL BOOTSTRAP CLASSES THAT HAVE NOT YET BEEN INITIALIZED FOR THE ISOLATE

↓

206
INITIALIZE EACH OF THE SELECTED BOOTSTRAP CLASSES FOR THE ISOLATE IN THE CONTEXT OF THE SHARED OBJECT REGION

↓

208
ATTACH ISOLATE TO SHARED OBJECT REGION

ENFORCING PROPER RESOLUTION FOR CLASSES OF SHARED OBJECTS IN A VIRTUAL MACHINE

CROSS-REFERENCE TO RELATED APPLICATION

The present application is related to U.S. patent application Ser. No. 11/482,603, which is titled "SHARING DATA AMONG ISOLATED APPLICATIONS," which was filed on Jul. 6, 2006, and which is incorporated by reference herein.

BACKGROUND

U.S. patent application Ser. No. 11/482,603 describes how isolated JAVA applications ("isolates") can share objects with each other by creating such objects within a memory area that all of those isolates can access. Such a memory area is referred to as a "shared object region." As described in the foregoing application, after one isolate has created an object within a shared object region, other isolates (which already may be attached to the shared object region or which may later attach to the shared object region) may access that object within the shared object region. Those other isolates also may create objects within the shared object region. Objects created in the shared object region may persist even after the isolate that created those objects terminates.

In the JAVA environment described in the foregoing application, all objects that are contained in a shared object region are instances of classes that are defined either by (a) a shared class loader that is dedicated exclusively to that shared object region or (b) the bootstrap class loader. Each isolate has its own bootstrap class loader, but each bootstrap class loader exhibits the same behavior with respect to a class type definition. All classes that are defined by the shared class loader are subclasses (immediate or non-immediate) of at least one class that is defined by the bootstrap class loader. This is because, according to the JAVA programming language, all classes are part of a class hierarchy. The "Object" class sits at the apex of this class hierarchy; all other classes are subclasses (immediate or non-immediate) of the "Object" class. The "Object" class is one of the classes that are defined by the bootstrap class loader.

At any given time during the execution of a JAVA program, each class to which that program refers may be in any one of several different states. For example, a class may be in the "loaded" state, the "linked" state, the "initializing" state, or the "initialized" state. Typically, a class will proceed from one state to another (e.g., from the "loaded" state to the "linked" state to the "initializing" state to the "initialized" state) during the execution of the program that uses the class. If separate isolates that are attached to the same shared object region see the class of a particular object that is stored in that region as being in different states at the same time, then one or more of those isolates may function improperly. For example, if a particular shared object region contains an object that is an instance of an "employee" class, and if one isolate that is attached to that region sees the "employee" class as being in the "initialized" state at a particular instance in time, and if another isolate that is attached to that region sees the "employee" class as being in the "loaded" state at the particular instance in time, then one or both of those isolates may function improperly. Further, the class that sees the "employee" class as being in the "loaded" state will violate the specifications of the JAVA programming language since the specifications state that a class must be initialized before instances of it may be created.

SUMMARY

One purpose of an embodiment of the invention is to enforce that classes that are defined by bootstrap class loader (i.e., bootstrap classes) upon which a shared object region depends have the same state in all isolates that are attached to the shared object region.

Techniques disclosed herein ensure that, at any instance in time in which a shared object region contains one or more objects that are instances of a particular class, separate isolates that are attached to that region will see the particular class as being in the same state. For example, if a shared object region contains one or more objects that are instances of the "ArrayList" class defined by the bootstrap class loader, then techniques disclosed herein ensure that each isolate that attaches to (or already is attached to) the region will see the "ArrayList" class as being in the same state (e.g., initialized).

According to one technique, for each shared object region, a list of all of the isolates that currently are attached to that region is maintained. Further, for each shared object region, a list of classes that are defined by bootstrap class loaders and used in the shared object region is maintained. This list is called the list of dependent classes of the shared object region. The list of dependent classes of a shared object region is updated with bootstrap classes that are used in the population of objects in the shared object region. The list of dependent classes keeps track of both the name and initialization state of the dependent bootstrap classes. According to one technique, whenever an isolate attaches to a shared object region, that region's list of dependent classes is passed to the isolate so that the isolate can bring the classes indicated therein to the state appropriate for use of the shared object region.

According to one technique, a shared object region becomes dependent on a bootstrap class when one of following event occurs: (i) direct loading: execution of code in the context of the shared object region that may cause loading of a bootstrap class; (ii) direct initialization: execution of code in the context of the shared object region that may cause direct initialization of a bootstrap classes; (iii) indirect loading: loading of a class defined by the shared class loader that may cause the loading of a bootstrap class; and (iv) indirect initialization: initialization of a class defined by the shared class loader that may cause the initialization of a bootstrap class. Whenever one of these events occurs, the dependent bootstrap class is added to the list of dependent bootstrap classes of a shared object region if it is not already in it, and its state is recorded.

According to one technique, threads of an isolate comprise a field that indicates whether they are executing in the context of a shared object region and which one. The field is null if the thread doesn't execute in the context of a shared object region, and holds the identity of the shared object region otherwise. Threads enter and exit the context of a shared object region using a well-defined application programming interface (API) that appropriately updates the field that indicates the execution context of the thread.

Direct initialization of a class that is defined by a bootstrap class loader may result whenever any one of a certain set of bytecodes is executed in the context of a shared object region. For example, in the JAVA programming language, execution of the getstatic, putstatic, new, and invokestatic bytecodes results in the initialization of the class whose name is indicated as an operand to the bytecode. According to one technique, whenever any of these bytecodes is executed in the context of a shared object region (which can be determined by examining the field of the current thread that indicates the thread's execution context) and the class indicated in the operand is defined by a bootstrap class loader and is not in the list of dependent classes, the class is added to the list of dependent classes of the shared object region. There is no need to add the superclass of the bootstrap class to the list of dependent class.

Indirect initialization of a bootstrap class may result from the initialization of a class defined by the shared class loader of a shared object region. By specification of the JAVA virtual machine, initialization of a class requires that its superclass be initialized. Thus, only bootstrap classes that are immediate superclasses of a class defined by the shared object regions need to be recorded in the list of dependent classes of the shared object region. According to one technique, upon initialization of a class defined by a shared class loader, the superclass of the class is added to the list of dependent classes of the shared object region if the superclass is defined by a bootstrap loader and is not already in the list of dependent classes. If the superclass is already in the list but the recorded state is not the initialized state, then the list is updated with the new state of the superclass.

Indirect loading of a bootstrap class may result from the loading of class by a shared class loader. By specification of the JAVA virtual machine, loading of a class requires that its superclass is loaded first. Thus, only bootstrap classes that are immediate superclasses of a class defined by the shared class loader of the shared object region need to be recorded in the list of dependent classes of the shared object region. According to one technique, upon the loading of a class defined by a shared class loader, the superclass of the class is added to the list of dependent classes of the shared object region if the superclass is defined by a bootstrap loader and is not already in the list of dependent classes. If the superclass is already in the list, then there is no need to update the recorded state since the superclass must be already in the loaded state if it is in the list.

Direct loading of a bootstrap class may result from the explicit loading of a class by the execution of code using reflexive capabilities of the JAVA programming language in the context of a shared object region. For example, each of the following statements may cause the direct loading of the bootstrap class ArrayList:

Class c1=Class.forName("ArrayList");
Class c2=ArrayListS1.class;

According to one technique, whenever such statements are executed from within the context of a shared object region, the class whose reference is obtained reflexively is added to the list of dependent classes of the shared object region if the class is defined by a bootstrap loader and is not already in the list of dependent classes.

According to one technique, when the list of dependent classes of a shared object region is updated, due to any of the four events discussed above, all isolates that currently are attached to the shared object region must verify that the bootstrap class added to the list is in the state recorded in the list. According to one technique, isolates for which this is not the case must bring the bootstrap class to the appropriate state, first by loading the class if it isn't already loaded, and then by performing the necessary operations to bring the bootstrap class to the appropriate state (for instance, by initializing the class if the required state is the initialized state).

Isolates already load and initialize many bootstrap classes at program startup, that is, before handing control to the entry point of a program. Therefore, a first simple (optional) optimization described herein is to ignore these startup classes.

Specifically, in one embodiment of the invention, classes defined at startup are not entered in the list of dependent classes. Further, because many commonly used bootstrap classes are likely to be loaded before applications attach to a shared object region, the techniques described herein often will merely verify that a class has been loaded by a particular isolate. Moreover, in multi-tasking virtual machines with transparent sharing of the runtime representation of classes, the runtime representation of a particular bootstrap class loaded by at least one isolate is already available in memory and available for sharing with any isolates. Thus, subsequent loading of that class by other isolates might only comprise creating the task-dependent part of the runtime representation, and avoid the much more expensive steps of locating, on the file system, the class file that contains the binary definition of the class, its parsing, verifying, checking of class loading constraints, construction into a shared runtime representation from the class file, and updating of the various bookkeeping data structures that are maintained by the JVM.

According to one embodiment of the invention, classes above the lowest-occurring bootstrap class in the class dependency chain do not need to be stored in the region's list of dependent bootstrap classes because loading the lowest-occurring bootstrap class in any isolate causes that isolate to load the remainder of the classes from which the lowest-occurring bootstrap class inherits.

For example, a shared class loader-defined class S2 might inherit from another shared class loader-defined class S1, S1 might inherit from a bootstrap class B2, and B2 might inherit from another bootstrap class B1. Under these circumstances, if a region's shared class loader's loading of S2 requires the loading of B2, then only B2 needs to be recorded in the region's bootstrap class list.

Techniques disclosed herein ensure that an appropriate bootstrap class is initialized in all isolates that currently are attached to a shared object region before those isolates are allowed to see the class. In one embodiment of the invention, the loading and initialization of new classes is atomic with respect to shared class loading and explicit execution of any of the bytecodes discussed above.

Thus, techniques described herein ensure that, whenever a particular isolate uses an object that is contained in a shared object region, the particular isolate's bootstrap class loader already has loaded and initialized all of the bootstrap classes that the object's class needs.

DETAILED DESCRIPTION OF EMBODIMENT(S)

Overview

According to a technique described herein, in response to an isolate's attempt to initialize a particular class while executing in the context of a shared object region, an identity of a bootstrap class loader-defined class ("bootstrap class") is added to a list of dependent bootstrap classes that is associated specifically with that shared object region (and no other shared object region). The bootstrap class whose identity is added to the region's associated bootstrap class list is either the particular class, if the particular class is a bootstrap class, or a superclass (immediate or non-immediate) of the particular class that is both (a) a bootstrap class and (b) an immediate superclass of a shared class loader-defined (non-bootstrap) class. Each shared object region's list of dependent bootstrap classes indicates a summary of the bootstrap classes that need to be in the same state in all the isolates that are attached to that region. The summary is a subset of all the bootstrap classes that need to be in the same state in all the isolates that are attached to that region. The entire set can be inferred from the inheritance relationships between bootstrap classes.

According to one technique described herein, in response to an isolate's attempt to attach to a shared object region, each of the bootstrap classes that is both (a) in the region's associated list of dependent bootstrap classes, and (b) not yet, for that isolate, in the state recorded in that list, is first loaded for that isolate, and brought to the appropriate state. Thus, the set of bootstrap classes that are summarized by the list of dependent bootstrap classes of the region are in the same state in that isolate as well as all other isolate attached to the shared object region.

According to one technique described herein, in response to an isolate's addition of a bootstrap class to the list of dependent bootstrap classes of a shared object region, the bootstrap class is automatically brought into the same state for each of the other isolates that currently are attached to that region. Thus, the bootstrap class is seen by all of the isolates that are currently attached to the region as being in the same state.

These and other techniques according to embodiments of the invention are described in greater detail below.

Example System

Figure 4:
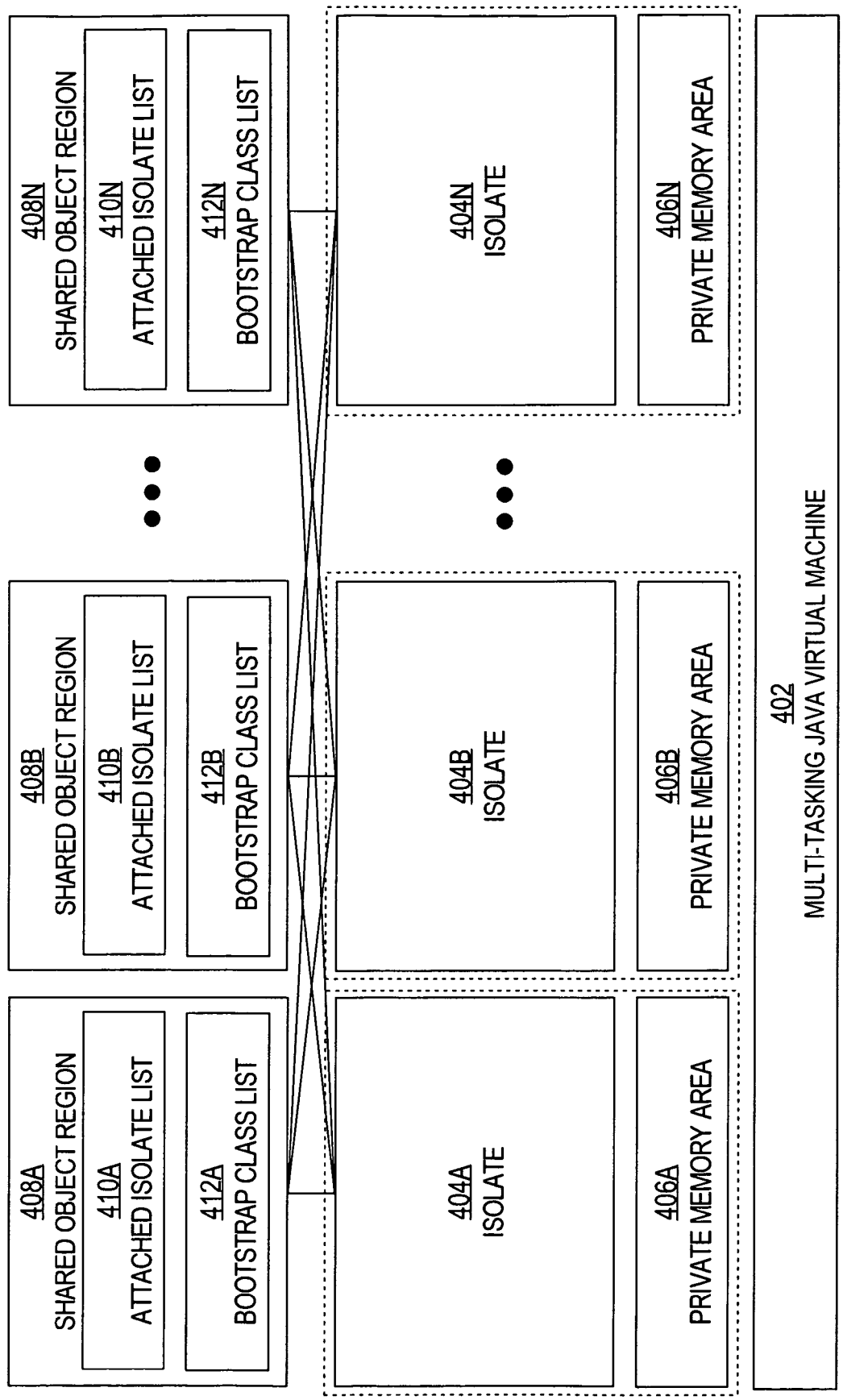
FIG. 4 is a block diagram that illustrates an example of a system in which separate isolates that are attached to a shared object region are ensured to see the same state for a given shared object's class, according to an embodiment of the invention.

FIG. 4 is a block diagram that illustrates an example of a system in which separate isolates that are attached to a shared object region are ensured to see the same state for a given shared object's class, according to an embodiment of the invention. Such a system may be implemented within one or more programs that are executing on a computer, for example.

The system comprises a multi-tasking Java Virtual Machine (JVM) 402 and multiple isolates 404A-N that concurrently execute in the context of and with the assistance of JVM 402. Each of isolates 404A-N is a separate program (also called a "task"). Thus, the illustrated system may be called a "multi-tasking" system. Each of isolates 404A-N is associated with a private memory area (also called a "heap") that no other isolate is permitted to access. In FIG. 4, isolate 404A is associated with private memory area 406A, isolate 404B is associated with private memory area 406B, and so on.

The system further comprises multiple shared object regions 408A-N, although embodiments of the invention may involve as few as one such shared object region. Each shared object region is a separate memory area in which isolates may instantiate new objects and access existing objects—even objects that were instantiated by other isolates.

According to one embodiment of the invention, in order for an isolate to either instantiate a new object in a shared object region or access an existing object in that shared object region, the isolate first needs to attach to that shared object region. Multiple isolates may be attached concurrently to a particular shared object region, and a particular isolate may be attached concurrently to multiple shared object regions. In one embodiment of the invention, each of shared object regions 408A-N is associated with a separate one of attached isolate lists 410A-N. Each of attached isolate lists 410A-N indicates the identities of the isolates that currently are attached to the shared object region that corresponds to that attached isolate list. Each of attached isolate lists 410A-N may be stored within the corresponding one of shared object regions 408A-N to which that attached isolate list corresponds.

According to one embodiment of the invention, in order to keep track of which bootstrap class loader-defined classes ("bootstrap classes") are being used by a shared object region and in what state these bootstrap classes need to be for an isolate that attaches to the shared object region (so that the isolate can see those classes as being in the same state as all of the other isolates that are attached to that shared object region), each of shared object regions 408A-N is associated with a separate list of dependent bootstrap classes (lists 412A-N). Each one of lists 412A-N indicates the identities of a subset of the bootstrap classes used by their associated shared object region and on which an operation may need to be performed for each isolate that attaches to the corresponding shared object region if those bootstrap classes have not yet, for that isolate, been placed in the appropriate state (e.g., loaded or initialized).

Examples of techniques that operate upon and make use of the components of the system of FIG. 4 are described below.

Example Techniques

FIGS. 1A, 1B, 1C, and 1D are flow diagrams that illustrate an example of a technique for keeping track of bootstrap class loader-defined classes ("bootstrap classes") that need to be initialized for isolates that attach to a shared object region, according to an embodiment of the invention. The technique described with reference to FIGS. 1A, 1B, 1C, and 1D may be triggered whenever an isolate attempts to execute, in the context of a shared object region, one of the four bytecodes that require a class to be initialized (e.g., the "getstatic," "putstatic," "new," and "invokestatic" bytecodes).

Figure 1A:
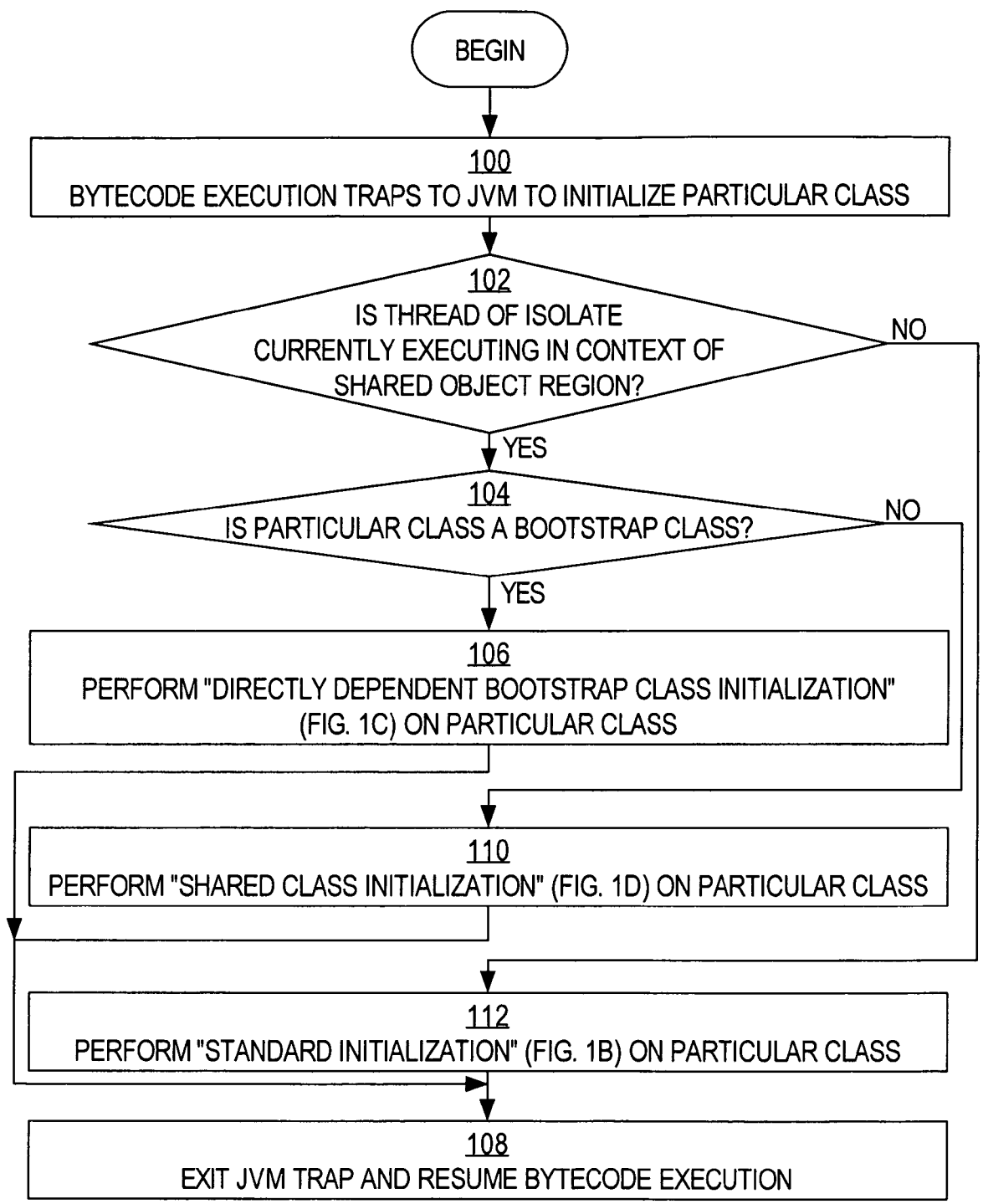
FIGS. 1A, 1B, 1C, and 1D are flow diagrams that illustrate an example of a technique for keeping track of bootstrap classes that need to be initialized for isolates that attach to a shared object region, according to an embodiment of the invention.

Referring first to FIG. 1A, in block 100, an isolate's execution of a bytecode traps to the JVM to initialize a particular class. In block 102, a determination is made as to whether the isolate's thread is currently executing in the context of a shared object region. In one embodiment of the invention, an isolate cannot execute in the context of a shared object region until that isolate has expressly entered that specific context through a defined process, as described in U.S. patent application Ser. No. 11/482,603. According to one embodiment of the invention, the defined process to enter the context of a shared object region includes setting, in a field of a descriptor of the current thread, an identifier of the shared object region. Performing a determination of whether a thread executes in the context of a shared object region comprises testing whether the field of the descriptor of the current thread is null. If it isn't, then the thread is executing in the context of a shared object region. If the isolate's thread is currently executing in the context of the shared object region, then control passes to block 104. Otherwise, control passes to block 112.

In block 104, a determination is made as to whether the particular class is a bootstrap class—that is, whether the particular class is defined by a bootstrap class loader. The bootstrap class loader is a built-in class loader with no first-class representation, and is typically represented with a null reference. Thus, the determination of whether a class is a bootstrap class can be made by testing whether the value of a field in the runtime representation of a class that holds a class loader reference is null. If the particular class is a bootstrap class, then control passes to block 106. Otherwise, control passes to block 110.

In block 106, "directly dependent bootstrap class initialization" is performed on the particular class. This initialization is described in greater detail with respect to blocks 122-134 of FIG. 1C. In this case, the particular class is a "directly dependent bootstrap class," which is a bootstrap class that will be added to the list of dependent bootstrap classes for a shared object region if that bootstrap class is not already in that list. The superclasses of the "directly dependent bootstrap class" are not added to the list, although those superclasses may enter the list as "directly dependent bootstrap classes" from other class initializations. Control passes to block 108.

In block 108, the JVM trap is exited and bytecode execution resumes.

Alternatively, in block 110, "shared class initialization" is performed on the particular class. This initialization is described in greater detail with respect to blocks 136-142 of FIG. 1D. In this case, the initialization is performed by a special recursive process that identifies the superclass of the class that is a "directly dependent bootstrap class" of the shared object region. Control then passes to block 108.

Alternatively, in block 112, "standard initialization" is performed on the particular class. This initialization is described in greater detail with respect to blocks 116-120 of FIG. 1B. In this case, initialization of the particular class is not initiated from the context of a shared object region. Control then passes to block 108.

Standard Initialization

Figure 1B:
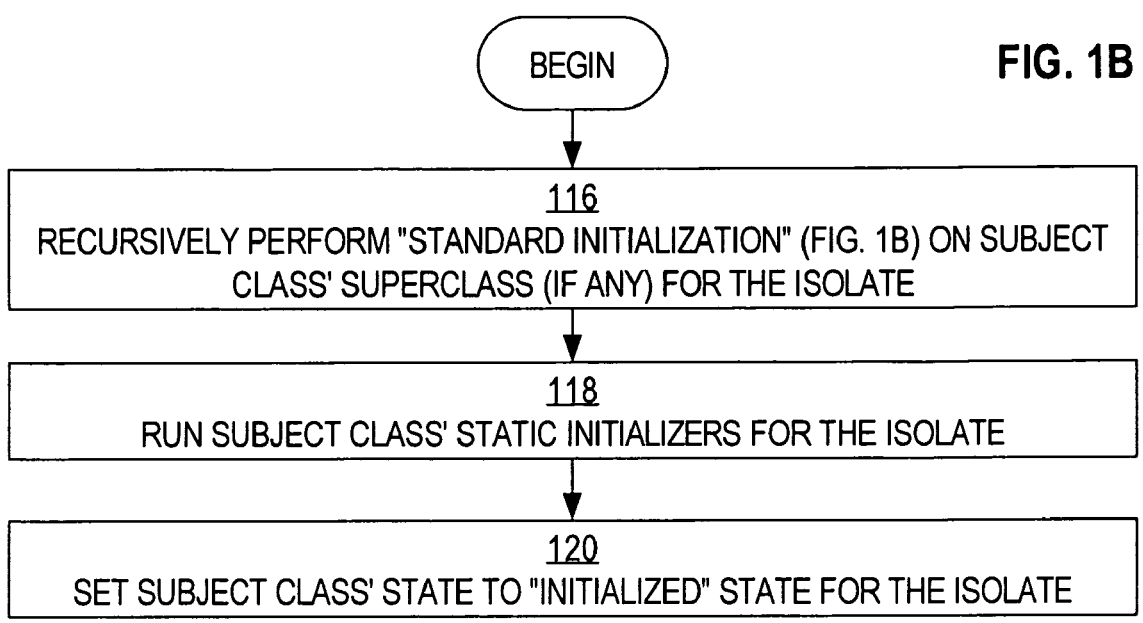

In the description below, the "subject class" is initially the "particular class" discussed above. Referring to FIG. 1B, in block 116, "standard initialization" (described with reference to FIG. 1B) of the subject class' superclass (if any) is performed for the isolate in a recursive manner (with the subject class' superclass as the subject class). In one embodiment of the invention, initialization of the subject class for the isolate requires the subject class' superclasses to be initialized first. Because this is a recursive process, it means that initialization of the subject class requires that all of the superclasses (both immediate and non-immediate) of the subject class will be completed for the isolate. For each class that is a superclass (immediate or non-immediate) of the subject class, initialization of the immediate superclass of that class (if any) is completed before the initialization of that class is completed.

In block 118, static initializers of the subject class are executed for the isolate if the subject class contains static initializer code. Execution of this code may trigger the technique described in FIG. 1A relative to one or more other classes to which the code might refer.

In block 120, the subject class's state is set to the "initialized" state for the isolate. Thus, initialization of the subject class for the isolate is completed.

Directly Dependent Bootstrap Class Initialization

Figure 1D:
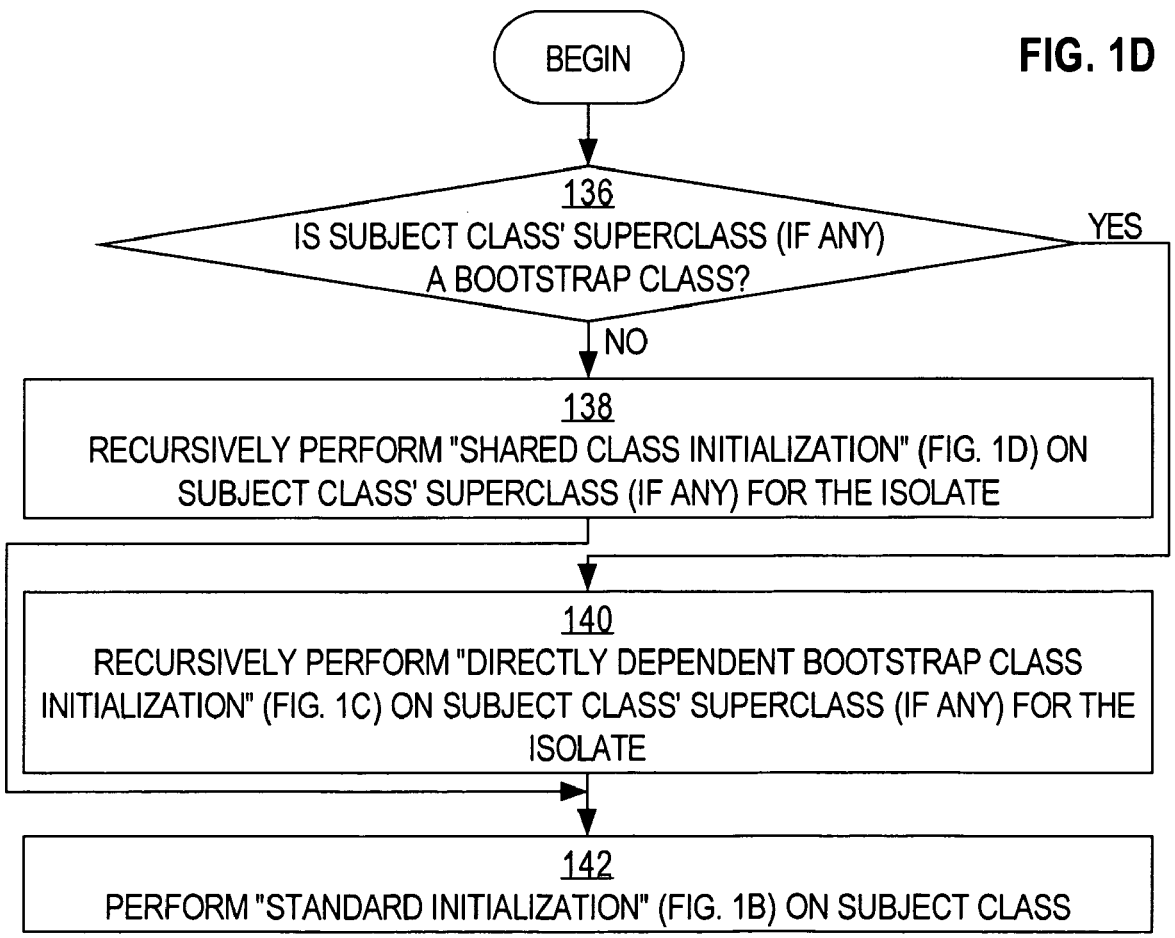
Figure 1C:
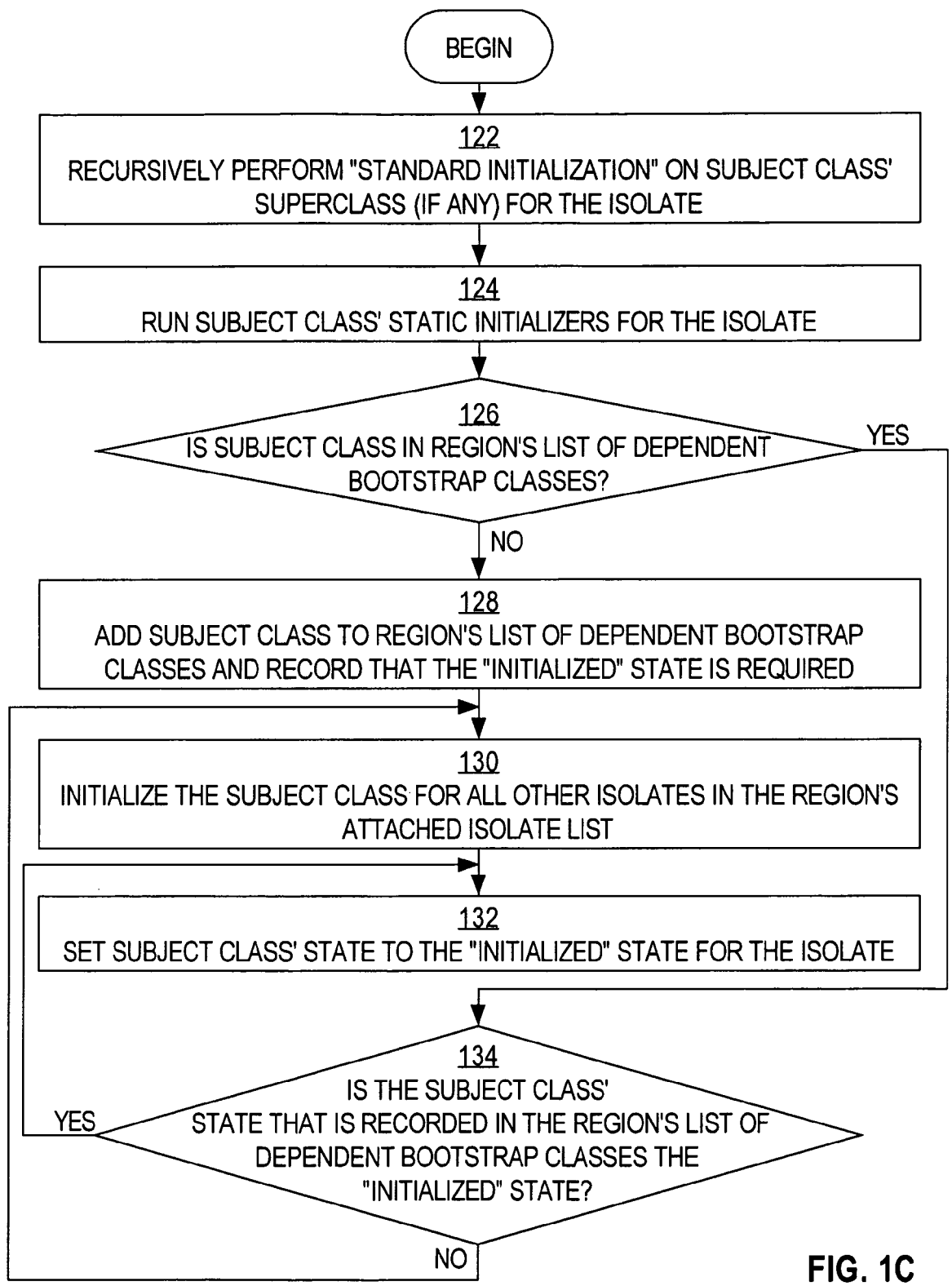

In the description below, the "subject class" is initially the "particular class" discussed above. Referring to FIG. 1C, in block 122, "standard initialization" (described with reference to FIG. 1B) of subject class' superclass (if any) is performed for the isolate in a recursive manner (with the subject class' superclass as the subject class). In block 124, static initializers of the subject class are executed for the isolate if the subject class contains static initializer code. Execution of this code may trigger the technique described in FIG. 1A relative to one or more other classes to which the code might refer.

In block 126, a determination is made as to whether the subject class is already in the list of dependent bootstrap classes for the shared object region in whose context the isolate's thread is currently executing. If the subject class is already in the list, then control passes to block 134. Otherwise, control passes to block 128.

In block 128, the subject class is added to the list of dependent bootstrap classes for the shared object region in whose context the isolate's thread is currently executing. A record is made that the initialized state is required. Control passes to block 130.

In block 130, the subject class is initialized for all other isolates that are in the attached isolate list of the shared object region in whose context the isolate's thread is currently executing. Control passes to block 132.

In block 132, the subject class' state is set to the "initialized" state for the isolate. Thus, initialization of the subject class for the isolate is completed.

Alternatively, in block 134, a determination is made as to whether the subject class's recorded state is the "initialized" state. This state is recorded in the list of dependent bootstrap classes of the shared object region in whose context the isolate's thread is currently executing. If this state is the "initialized" state, then control passes to block 132. Otherwise, control passes to block 130.

Shared Class Initialization

In the description below, the "subject class" is initially the "particular class" discussed above. Referring to FIG. 1D, in block 136, a determination is made as to whether the subject class' superclass (if any) is a bootstrap class. If the subject class' superclass is a bootstrap class, then control passes to block 140. Otherwise, control passes to block 138.

In block 138, "shared class initialization" (described with reference to FIG. 1D) is performed on the subject class' superclass (if any) in a recursive manner (with the subject's class superclass as the subject class). Control then passes to block 142.

Alternatively, in block 140, "directly dependent bootstrap class initialization" (described with reference to FIG. 1C) is performed on the subject class' superclass (if any) in a recursive manner (with the subject class' superclass as the subject class). Control then passes to block 142.

In block 142, "standard initialization" (described with reference to FIG. 1B) is performed on the subject class.

Initializing Classes When an Isolate Attaches to a Shared Object Region

As a result of the technique described above with reference to FIGS. 1A, 1B, 1C, and 1D, each shared object region is associated with a separate list of dependent bootstrap classes that is associated specifically with that shared object region (and not with any other shared object region). The list of dependent bootstrap classes that is associated with a particular shared object region indicates, at any instance in time, a subset of all the bootstrap classes that need to be in a particular state before an isolate that attaches to the shared object region can execute code in the context of the shared object region. The entire set of classes that needs to be set to a particular state (e.g., loaded, initialized, etc.) can be inferred from the inheritance relationships of the bootstrap classes whose identities is recorded in the list. The fact that a class may already be in the required state for one isolate does not imply that the class also is in the same state for any other isolate.

Figure 2:
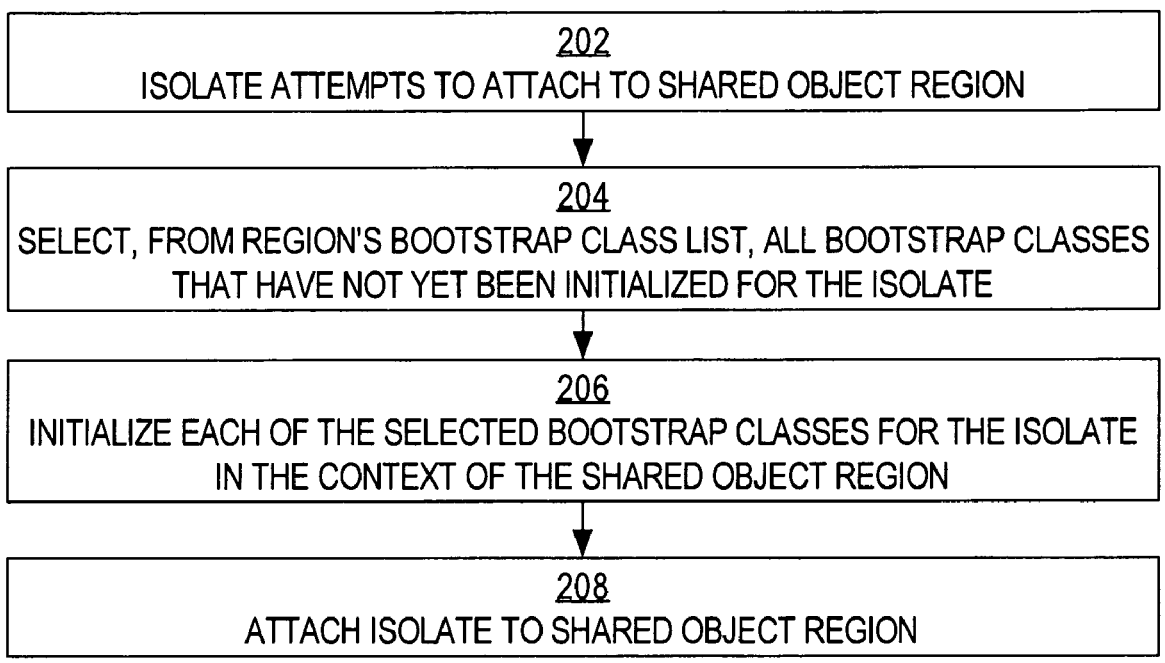
FIG. 2 is a flow diagram that illustrates an example of a technique for initializing certain bootstrap classes for an isolate when the isolate attaches to a shared object region, according to an embodiment of the invention.

FIG. 2 is a flow diagram that illustrates an example of a technique for initializing certain bootstrap classes for an isolate when the isolate attaches to a shared object region, according to an embodiment of the invention. The technique described with reference to FIG. 2 may be triggered whenever an isolate attempts to attach to a shared object region, for example.

In block 202, an isolate attempts to attach to a shared object region. An example process by which an isolate may attach to a shared object region is described in U.S. patent application Ser. No. 11/482,603. The shared object region may already contain objects that other isolates instantiated in the shared object region. The classes of some or all of these objects might not yet have been initialized relative to the isolate.

In block 204, in response to the isolate's attempt to attach to the shared object region, all of the bootstrap classes that have not yet been initialized for the isolate are selected from the bootstrap class list that is associated specifically with the shared object region, as described above. Thus, in one embodiment of the invention, only the bootstrap classes that need to be initialized for the isolate in order for the isolate to access the objects contained in the shared object region are selected. In one embodiment of the invention, bootstrap classes that already have been initialized for the isolate are not selected from the list.

In block 206, each of the selected bootstrap classes (selected in block 204) is initialized for the isolate. All superclasses (immediate and non-immediate) of the selected bootstrap classes that have not yet been initialized for the isolate also are initialized for the isolate in a recursive manner, such that, for each particular class that is a superclass (immediate or non-immediate) of a selected bootstrap class, initialization of the immediate superclass of the particular class (if any) is completed before the initialization of the particular class is completed. Initialization of the selected bootstrap classes and their superclasses may involve the execution of "static initializer" code contained within those classes. The statuses of the selected bootstrap classes and their just-initialized superclasses are set to the "initialized" state relative to the isolate.

In block 208, the isolate is attached to the shared object region. In one embodiment of the invention, the JVM adds the isolate's identity to a list of isolates that currently are attached to the shared object region. Each shared object region may be associated with a separate list of isolates that currently are attached to that shared object region. When an isolate detaches from a shared object region, the JVM may remove that isolate's identity from the list of isolates that currently are attached to that shared object region. As already described, the list of isolates that currently are attached to a shared object region may be used to initialize a particular class for all of the isolates that currently are attached to a shared object region in response to the initialization of the particular class for any isolate that currently is attached to that shared object region.

Initializing a Class for Isolates that Currently are Attached to a Shared Object Region As is discussed above with reference to FIG. 2, when a particular isolate attempts to attach to a shared object region, certain bootstrap classes that were not yet initialized for the particular isolate may be initialized for the particular isolate so that the particular isolate can access, in the shared object region, objects that are instances of either those bootstrap classes or subclasses of those bootstrap classes. This technique suffices for objects that were created in the shared object region by other isolates prior to the time that the particular isolate attached to the shared object region. However, sometimes one isolate may create a new object in a shared object region after other isolates already are attached to the shared object region. Under such circumstances, the other isolates might not be able to access the new object until the class of the new object and/or superclasses of that class have become initialized for those other isolates.

Figure 3:
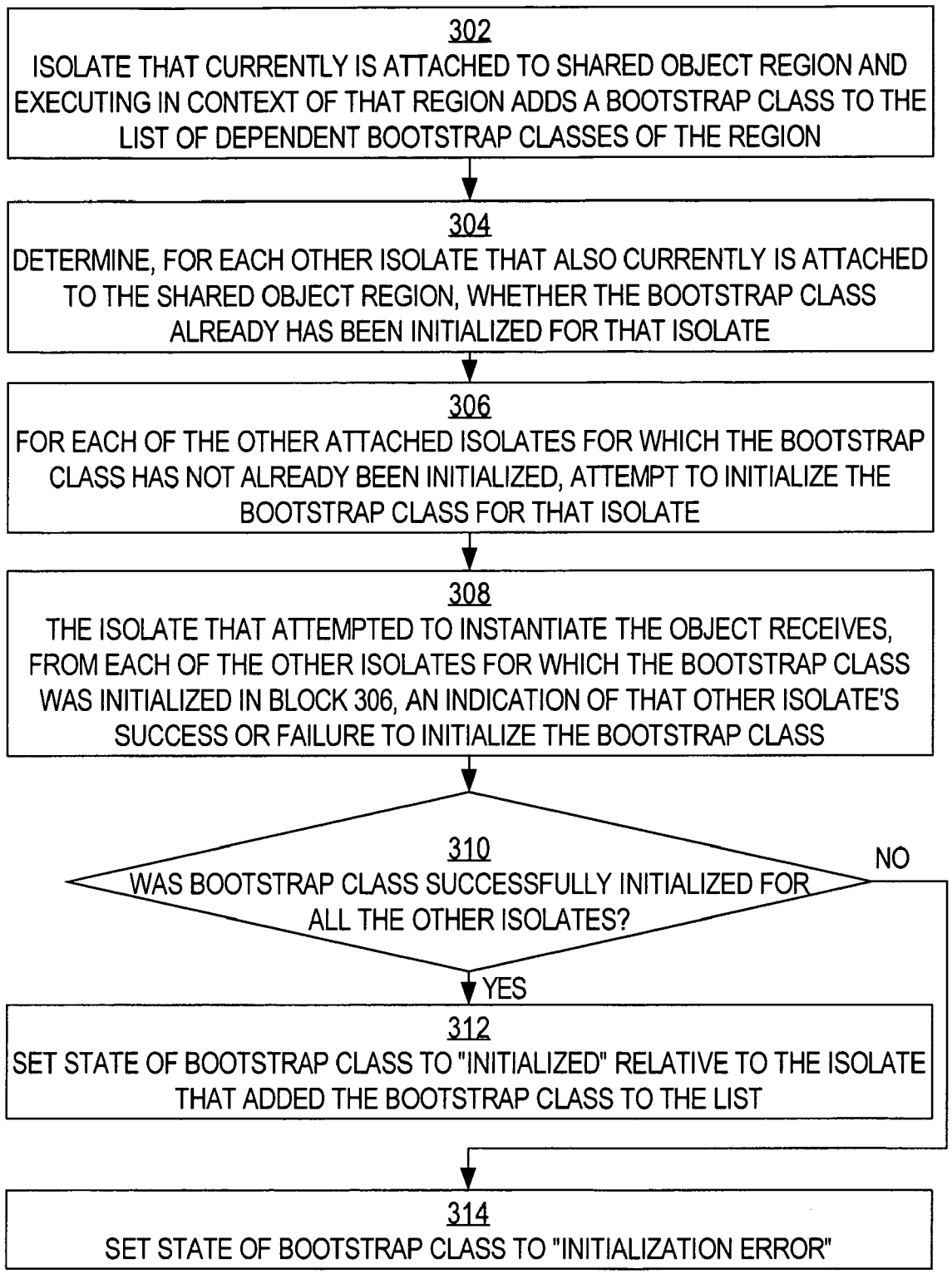
FIG. 3 is a flow diagram that illustrates an example of a technique for initializing certain bootstrap classes for one or more isolates that currently are attached to a particular shared object region when another isolate updates the list of dependent bootstrap classes of the shared object region, according to an embodiment of the invention.

FIG. 3 is a flow diagram that illustrates an example of a technique for initializing certain bootstrap classes for one or more isolates that currently are attached to a particular shared object region when another isolate updates the list of dependent bootstrap classes of the shared object region, according to an embodiment of the invention. The technique described with reference to FIG. 3 may be triggered whenever an isolate attempts to initialize a bootstrap class while executing in the context of a shared object region, for example.

In block 302, an isolate that currently is attached to a shared object region and executes in the context of the shared object region adds a bootstrap class to the list of dependent bootstrap class of the shared object region with the requirement that the class must be initialized. At this point, the bootstrap class is required to be initialized successfully for all other isolates that currently are attached to the shared object region as described below.

In block 304, following the addition of the bootstrap class to the list of dependent bootstrap class to the shared object region, for each particular isolate of the other isolates that currently are attached to the shared object region (the "currently attached isolates"), a determination is made as to whether the bootstrap class already has been initialized for that particular isolate. For example, the JVM may make this determination based on (a) the list of isolates that currently are attached to the shared object region and (b) the JVM-maintained state of the isolate-private representation of the bootstrap class for each such isolate.

In block 306, for each particular isolate of the other currently attached isolates for which the bootstrap class has not yet been initialized, the bootstrap class is initialized for that particular isolate. More specifically, the JVM may instruct each such isolate to initialize the bootstrap class for that isolate. All superclasses (immediate and non-immediate) of the bootstrap class that have not yet been initialized for the particular isolate also are initialized for the particular isolate in a recursive manner, such that, for each particular class that is a superclass (immediate or non-immediate) of the bootstrap class, initialization of the immediate superclass of the particular class (if any) is completed before the initialization of the particular class is completed. Initialization of the bootstrap class and superclasses may involve the execution of "static initializer" code contained within those classes. The statuses of the bootstrap class and just-initialized superclasses are set to the "initialized" state relative to the particular isolate.

In block 308, the isolate that initially added the bootstrap class to the list of dependent bootstrap class of the shared object region receives, from each of the other isolates that was instructed to initialize the bootstrap class (as described with reference to block 306), an indication of success or failure to initialize the bootstrap class for that other isolate.

In block 310, a determination is made as to whether all of the indications received from the other isolates in block 308 were indications of successful initialization. If all of these indications were indications of successful initialization, then control passes to block 312. Otherwise, control passes to block 314.

In block 312, the state of the bootstrap class relative to the isolate that initially added the bootstrap class to the list of dependent bootstrap class of the shared object region is set to "initialized." Thus, initialization of the bootstrap class for the isolate that initially added the bootstrap class to the list of dependent bootstrap class of the shared object region is completed.

Alternatively, in block 314, the state of the bootstrap class relative to the isolate that initially added the bootstrap class to the list of dependent bootstrap class of the shared object region is set to "initialization error."

Hardware Overview

Figure 5:
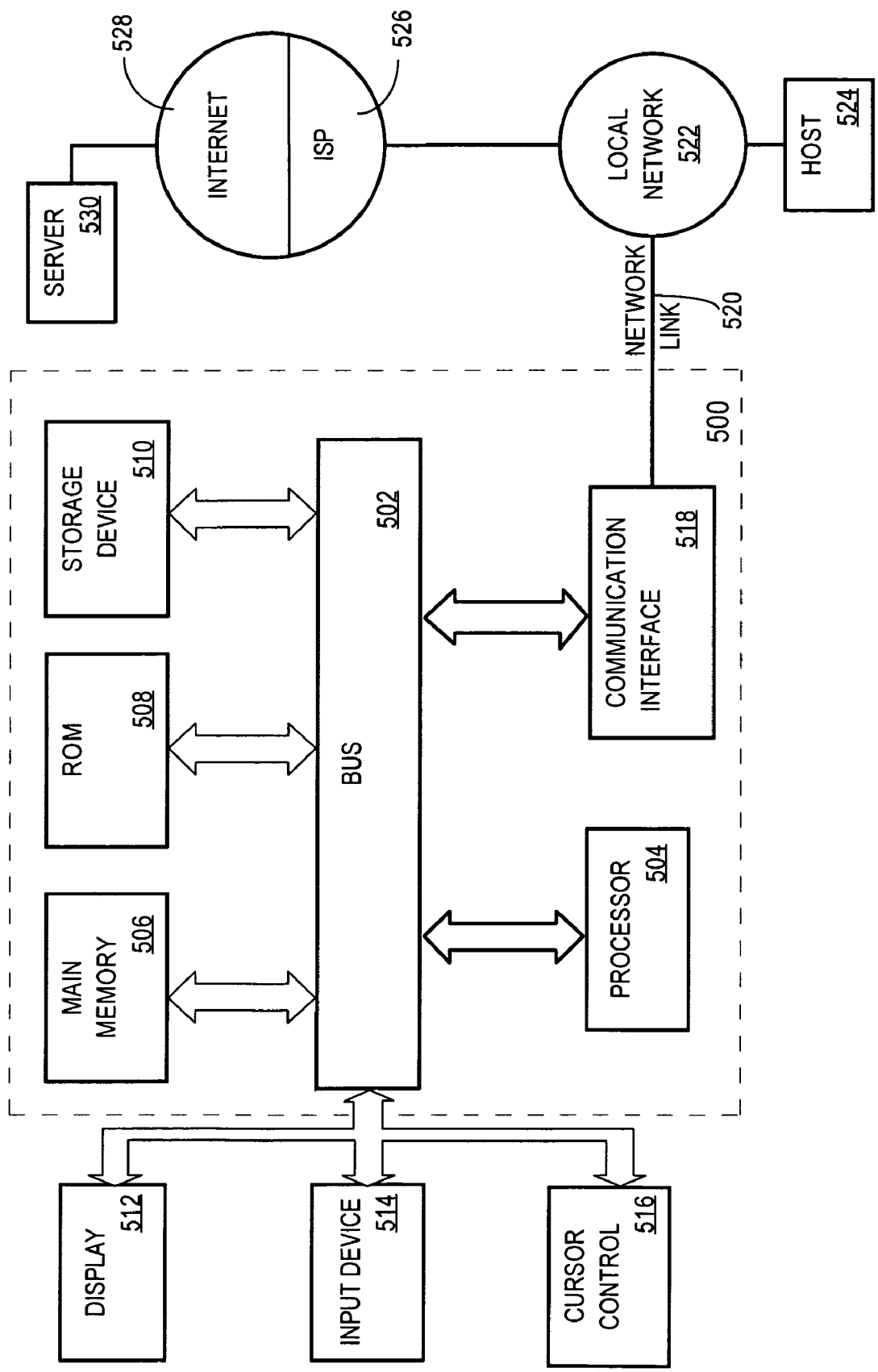
FIG. 5 is a hardware block diagram of an example computer entity, upon which certain embodiments of the invention may be implemented.

FIG. 5 is a block diagram that illustrates a computer system 500 upon which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, data, etc., to be exchanged between the various components. For example, bus 502 may be a set of conductors that carries electrical signals. Bus 502 may also be a medium that enables signals to be capacitively exchanged between one or more of the components. Bus 502 may further be a network connection that connects one or more of the components. Overall, any mechanism and/or medium that enables information, data, etc., to be exchanged between the various components may be used as bus 502.

Bus 502 may also be a combination of these mechanisms/media. For example, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and tangible media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 504 for execution. For example, the instructions may initially be carried on a magnetic disk of a remote computer. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

Processor 504 may execute the received code as the code is received and/or stored in storage device 510 or other nonvolatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for enforcing consistent states for bootstrap class loader-defined classes across at least two concurrently executing, separate applications attached to a first defined memory region, the method comprising:
    establishing an association between the first defined memory region and a first list of attached applications, wherein each one of the applications in the first list of attached applications is a concurrently executing, separate application that is attached to the first defined memory region;
    establishing an association between the first defined memory region and a first list of loaded dependent bootstrap class loader-defined classes, wherein each application in the first list of attached applications for the first defined memory region is required to maintain consistent states for each class in the first list of loaded dependent bootstrap class loader-defined classes;
    in response to a first application attempting to attach to the first defined memory region:
        sending, to the first application, the first list of loaded dependent bootstrap class loader-defined classes;
        selecting, by the first application from the first list of loaded dependent bootstrap class loader-defined classes, a first class that has not been initialized by the first application;
        initializing, by the first application, the first class; and
        adding, after the first class is initialized, the first application to the first list of attached applications.

2. The method of claim 1, further comprising:
    establishing an association between a second defined memory region, in which at least two concurrently executing, separate applications can instantiate objects, and a second list of loaded bootstrap class loader-defined classes; and
    in response to a second application attempting to attach to the second defined memory region:
        sending, to the second application, the second list of loaded dependent bootstrap class loader-defined classes;
        selecting, by the second application from the second list of loaded dependent bootstrap class loader-defined classes, a second class that has not been initialized by the second application;
        initializing, by the second application, the second class,
    wherein the second defined memory region is separate from the first defined memory region, and
    wherein the second list of loaded bootstrap class loader-defined classes is separate from the first list of loaded bootstrap class loader-defined classes.

3. The method of claim 1, further comprising:
    in response to a second application executing, in the context of the first defined memory region, a bytecode that requires initializing a second class:
        determining whether the second class is defined by a bootstrap class loader; and
    in response to determining that the second class is defined by a bootstrap class loader:
        adding an identity of the second class to the first list of loaded bootstrap class loader -defined classes when the identity of the second class is not already in the first list of loaded bootstrap class loader-defined classes.

4. The method of claim 3, wherein the bytecode that requires initializing a particular class is one of "getstatic," "putstatic," "invokestatic," and "new."

5. The method of claim 1, further comprising:
    in response to a second application executing, in the context of the first defined memory region, a bytecode that requires initializing a second class:
        determining whether the second class is defined by a bootstrap class loader;
    in response to determining that the second class is not defined by a bootstrap class loader:
        determining whether a superclass of the second class is defined by a bootstrap class loader; and
    in response to determining that the superclass is defined by a bootstrap class loader:
        adding an identity of the superclass to the first list of loaded dependent bootstrap class loader-defined classes without adding, to the first list of loaded dependent bootstrap class loader-defined classes, an identity of the second class.

6. The method of claim 1, further comprising:
in response to a second application adding an identity of a second class to the first list of loaded dependent bootstrap class loader-defined classes:
    initializing the second class for all other applications in the first list of attached applications.

7. A method for initializing a class, the method comprising:
attaching a first application and a second application to a defined memory region, wherein the first and second applications are concurrently executing and separate;
in response to the first and second applications attaching to the defined memory area:
    adding identities of the first and second applications to an attached application list that is associated with the defined memory area, wherein each application in the attached application list is required to maintain consistent states for each class in a first list of loaded dependent bootstrap class loader-defined classes associated with the defined memory area;

instantiating, by the first application, a particular object in the defined memory region; and in response to the first application instantiating the particular object in the defined memory region:

sending, to the second application, the first list of loaded dependent bootstrap class loader-defined classes, wherein the first list of loaded dependent bootstrap class loader-defined classes is associated with the defined memory region;

selecting, by the second application from the first list of loaded dependent bootstrap class loader-defined classes, a first class that has not been initialized by the second application;

initializing the first class for the particular object for the second application.

8. A machine-readable medium storing instructions, which when executed by one or more processors, cause the one or more processors to carry out steps comprising:

establishing an association between the first defined memory region and a first list of attached applications, wherein each one of the applications in the first list of attached applications is a concurrently executing, separate application that is attached to the first defined memory region;

establishing an association between the first defined memory region and a first list of loaded dependent bootstrap class loader-defined classes, wherein each application in the first list of attached applications for the first defined memory region is required to maintain consistent states for each class in the first list of loaded dependent bootstrap class loader-defined classes;

in response to a first application attempting to attach to the first defined memory region:

sending, to the first application, a first list of loaded dependent bootstrap class loader-defined classes;

selecting, by the first application from the first list of loaded dependent bootstrap class loader-defined classes, a first class that has not been initialized by the first application;

initializing, by the first application, the first class; and adding, after the first class is initialized, the first application to the first list of attached applications.

9. The machine-readable medium of claim 8, wherein the steps further comprise:

establishing an association between a second defined memory region, in which at least two concurrently executing, separate applications can instantiate objects, and a second list of loaded bootstrap class loader-defined classes; and in response to a second application attempting to attach to the second defined memory region:

sending, to the second application, the second list of loaded dependent bootstrap class loader-defined classes;

selecting, by the second application from the second list of loaded dependent bootstrap class loader-defined classes, a second class that has not been initialized by the second application;

initializing, for the second application, the second class, wherein the second defined memory region is separate from the first defined memory region, and wherein the second list of loaded bootstrap class loader-defined classes is separate from the first list of loaded bootstrap class loader-defined classes.

10. The machine-readable medium of claim 8, wherein the steps further comprise:

in response to a second application executing, in the context of the first defined memory region, a bytecode that requires initializing a second class:

determining whether the second class is defined by a bootstrap class loader; and in response to determining that the second class is defined by a bootstrap class loader:

adding an identity of the second class to the first list of loaded bootstrap class loader -defined classes when the identity of the second class is not already in the first list of loaded bootstrap class loader-defined classes.

11. The machine-readable medium of claim 10, wherein the bytecode that requires initializing a particular class is one of "getstatic," "putstatic," "invokestatic," and "new."

12. The machine-readable medium of claim 8, wherein the steps further comprise:

in response to a second application executing, in the context of the first defined memory region, a bytecode that requires initializing a second class:

determining whether the second class is defined by a bootstrap class loader;

in response to determining that the second class is not defined by a bootstrap class loader:

determining whether a superclass of the second class is defined by a bootstrap class loader; and in response to determining that the superclass is defined by a bootstrap class loader:

adding an identity of the superclass to the first list of loaded dependent bootstrap class loader-defined classes without adding, to the first list of loaded dependent bootstrap class loader-defined classes, an identity of the second class.

13. The machine-readable medium of claim 8, wherein the steps further comprise:

in response to a second application adding an identity of a second class to the first list of loaded dependent bootstrap class loader-defined classes:

initializing the second class for all other applications in the first list of attached applications.

14. A machine-readable medium storing instructions, which when executed by one or more processors, cause the one or more processors to carry out steps comprising:

attaching a first application and a second application to a defined memory region, wherein the first and second applications are concurrently executing and separate;

in response to the first and second applications attaching to the defined memory area:

adding identities of the first and second applications to an attached application list that is associated with the defined memory area, wherein each application in the attached application list is required to maintain consistent states for each class in a first list of loaded dependent bootstrap class loader-defined classes associated with the defined memory area;

instantiating, by the first application, a particular object in the defined memory region; and in response to the first application instantiating the particular object in the defined memory region:

sending, to the second application, the first list of loaded dependent bootstrap class loader-defined classes, wherein the first list of loaded dependent bootstrap class loader-defined classes is associated with the defined memory region;

selecting, by the second application from the first list of loaded dependent bootstrap class loader-defined classes, a first class that has not been initialized by the second application;

initializing the first class for the particular object for the second application.

* * * * *